(12) United States Patent
Wasson et al.

(10) Patent No.: US 9,670,948 B1
(45) Date of Patent: Jun. 6, 2017

(54) LATCH FOR SEQUENTIALLY EXTENDED MECHANICAL MAST

(71) Applicant: The Will-Burt Company, Orrville, OH (US)

(72) Inventors: Andrew Paul Wasson, Wooster, OH (US); Douglas Anthony Jacobs, Wooster, OH (US)

(73) Assignee: THE WILL-BURT COMPANY, Orrville, OH (US)

( * ) Notice: Subject to any disclaimer, the term of this patent is extended or adjusted under 35 U.S.C. 154(b) by 0 days.

(21) Appl. No.: 15/007,323

(22) Filed: Jan. 27, 2016

(51) Int. Cl.
F16B 7/10 (2006.01)

(52) U.S. Cl.
CPC .................. F16B 7/105 (2013.01)

(58) Field of Classification Search
CPC ....... F16M 11/28; E04H 12/14; E04H 12/182; F16B 7/10; F16B 7/105; F16B 7/14; F16B 7/1454
See application file for complete search history.

(56) References Cited

U.S. PATENT DOCUMENTS

| | | | | |
|---|---|---|---|---|
| 2,849,249 A | * | 8/1958 | Fridolph | A45B 23/00 248/412 |
| 3,248,831 A | * | 5/1966 | Jones | E04H 12/182 29/897.33 |
| 3,688,455 A | | 9/1972 | Zebuhr | |
| 4,029,279 A | * | 6/1977 | Nakatani | F16B 7/1454 248/188.5 |
| 4,434,970 A | * | 3/1984 | Boland | F16B 7/105 254/108 |
| 4,871,138 A | * | 10/1989 | Sauter | F16B 7/105 248/408 |
| 5,101,215 A | * | 3/1992 | Creaser, Jr. | E04H 12/182 343/883 |
| 5,218,375 A | | 6/1993 | Hillman | |
| 5,314,157 A | * | 5/1994 | Linnepe | B60S 9/04 248/354.1 |
| 5,697,417 A | * | 12/1997 | Spoon | E04F 10/0603 160/71 |
| 6,152,638 A | * | 11/2000 | Lindsay | F16M 11/32 403/104 |

(Continued)

FOREIGN PATENT DOCUMENTS

WO    WO 93-07395    4/1993

OTHER PUBLICATIONS

International Search Report and Written Opinion dated Mar. 7, 2017.

*Primary Examiner* — Daniel Wiley
(74) *Attorney, Agent, or Firm* — Fay Sharpe LLP

(57) ABSTRACT

A latch assembly and telescoping mast having a plurality of telescoping tube sections including the same wherein the latch assembly includes a first latch member mounted to an associated first tube section, a second latch member mounted to an associated second tube section and configured to selectively engage the first latch member to interlock the first and second associated tubes when the associated first tube section is at least partially extended from the associated second tube section, and a trigger member mounted to an associated third tube section. The second latch member includes a latch housing having an opening configured to receive the trigger post when the second associated tube section is retracted into the third associated tube section.

20 Claims, 4 Drawing Sheets

(56) References Cited

U.S. PATENT DOCUMENTS

| | | | |
|---|---|---|---|
| 6,837,642 B1* | 1/2005 | Lin | F16B 7/105 403/109.1 |
| 6,854,697 B2* | 2/2005 | Akaike | F16M 11/32 248/161 |
| 7,293,934 B1* | 11/2007 | Huang | F16B 7/105 403/109.1 |
| 7,374,380 B2* | 5/2008 | Huang | E04H 12/182 410/143 |
| 8,002,242 B2* | 8/2011 | Lu | B66F 1/04 254/108 |
| 8,128,306 B2* | 3/2012 | Gorza | B62J 1/08 248/354.7 |
| 2007/0108756 A1* | 5/2007 | Laakso | A63C 11/221 280/823 |
| 2007/0252067 A1* | 11/2007 | Lee | F16B 7/105 248/407 |
| 2010/0187375 A1* | 7/2010 | Yoshimori | F16M 11/28 248/157 |
| 2012/0205510 A1* | 8/2012 | Fortier | A45C 13/262 248/423 |
| 2013/0239490 A1 | 9/2013 | Peng et al. | |
| 2015/0050070 A1* | 2/2015 | Dykes | H01Q 1/1235 403/109.2 |
| 2015/0211250 A1* | 7/2015 | Bach | F16M 11/28 52/111 |

\* cited by examiner

LATCH FOR SEQUENTIALLY EXTENDED MECHANICAL MAST

BACKGROUND

The exemplary embodiment relates to masts. It finds particular application in conjunction with telescoping masts for antennas, lights and other payloads, and will be described with particular reference thereto. However, it is to be appreciated that the exemplary embodiment is also amenable to other like applications.

Telescoping masts generally include multiple tube sections that are configured to telescope or nest within each other. A drive system is typically configured to sequentially deploy and/or retract the tubes between extended and retracted configurations. Locks or latches are generally used to lock each tube to its adjacent tube or tubes when in the extended configuration.

High-end telescoping mast customers, particularly military customers, are using mechanical masts for vehicle mounted, unguyed payload elevation involving highly sensitive surveillance and targeting electronics. These electronics are often used in an attempt to view objects over very long distances and are adversely affected by poor stability. In many applications, maintaining line-of-sight to targets is very important.

There are generally two techniques used to stabilize the payload of a telescoping mast. A first technique is gyro stabilization. Gyro stabilization can be used but it adds significant weight and cost to the payload. A second technique uses sophisticated algorithms to correct the captured image and maintain sight of their "target", but such technique is not highly effective for rapid and "unpredictable" movements.

The interaction of external forces (such as wind) and clearances in the mast joints cause rapid and "unpredictable" movements that decrease the performance of long range "viewing" payloads. These movements can be small changes in heading (north, south, east, west), commonly called rotation and/or small changes in relation to the horizon, commonly called deflection.

The current art generally attempts to limit rotational movement via direct interaction between the tubes. The bottom, or base, tube is rigidly attached to a vehicle or shelter. In the case of cylindrical tubes, all of the subsequent tubes above that tube are prevented from rotating by a raised or recessed surface that creates at least one edge along the entire length of the tubes. That edge interacts with a groove or protrusion on the mating tube structure such that any two tubes can slide axially (extend/retract) relative to each other but are prevented from rotating with respect to the each other and the base tube. This is commonly called "keying" the tubes or a "key" and "keyway" arrangement. In the case of non-cylindrical tubes, the shape of the tube itself prevents rotation via interaction of the corners of tubes.

The current art similarly attempts to limit deflection via direct interaction between the tubes. Again, the bottom, or base, tube is rigidly attached to a vehicle or shelter. The subsequent tubes, even when fully extended, maintain a substantial overlap. That is, each tube remains inside the tube below it by a significant percentage of its length, commonly called "lap distance." With this lap distance and by maintaining a close fit between the outer diameter of one tube and the inner diameter of the tube below it, the amount that one tube can freely tilt with respect to the tube below it is limited.

To allow the sliding movement (extension and retraction of the mast) under reasonable manufacturing tolerances and under typical military environmental conditions (hot, cold, sand, dust, ice, etc.) clearance must be maintained between the interacting surfaces to prevent binding. That clearance directly causes increased rotation and deflection.

The locks or latches on each tube provides vertical support against the weight of the payload to keep the tube extended after it has been driven to its extended position by the mast drive system. It is generally considered desirable to have such locks be automatically driven by the normal extension/retraction of the mast so that no outside power is required (for simplicity) and no manual intervention is required (for safety and to allow remote operation). The locks are a source of noise that can, in some instances, make the mast unfit for certain applications (e.g., military applications).

Current lock designs tend to be noisy, require a large space, require manual engagement, and/or require a separate power source. In addition, many lock designs only lock the tubes in the extended position.

BRIEF DESCRIPTION

In accordance with one aspect of the disclosure, an automatic locking system is provided that is driven by the normal extension and retraction of the mast, reduces the inherent rotation and deflection of the mast due to clearances, and operates more smoothly and quietly than conventional locking systems. The locking system also fits reasonably within the existing footprint of a typical mechanical mast.

In accordance with another aspect, a latch assembly for a telescoping mast having a plurality of telescoping tube sections comprises a first latch member mounted to an associated first tube section, a second latch member mounted to an associated second tube section and configured to selectively engage the first latch member to interlock the first and second associated tubes, and a trigger member mounted to an associated third tube section. The second latch member includes, a latch housing having an opening configured to receive the trigger post when the second associated tube section is retracted into the third associated tube section, a lock member supported by the latch housing for pivoting movement between an unlocked position and a locked position, and a nest lock bar supported by the housing for pivoting movement between an engaged position and a disengaged position. The lock member is movable from the unlocked position to the locked position by the first latch member when the first associated tube section is extended out of the second associated tube section to thereby interlock the first associated tube section with the second associated tube section, the lock member movable from the locked position to the unlocked position by the first latch member when the first associated tube section is retracted into the second associated tube section. The nest lock bar is biased to the disengaged position and movable to the engaged position by the trigger post upon extension of the second associated tube section out of the third associated tube section, the nest lock bar configured to restrict movement of the lock member from the locked position when in the engaged position.

In accordance with another aspect, a telescoping mast comprises a plurality of telescoping tube sections, a first latch member mounted to a first tube section, a second latch member mounted to a second tube section, said first tube section adapted to be telescopically received within the second tube section, and a trigger member mounted to a third tube section, the first and second tube sections adapted to be telescopically received within the third tube section. The second latch member includes a latch housing having an opening configured to receive the trigger member when the second associated tube section is retracted into the third associated tube section, a lock member supported by the latch housing for pivoting movement between an unlocked position and a locked position, and a nest lock bar supported by the housing for pivoting movement between an engaged position and a disengaged position. The lock member is movable from the unlocked position to the locked position by the first latch member as the first associated tube section is extended out of the second associated tube section to thereby interlock the first associated tube section with the second associated tube section in an extended configuration, the lock member movable from the locked position to the unlocked position by the first latch member as the first associated tube section is retracted into the second associated tube section. The nest lock bar is biased to the disengaged position and movable to the engaged position by the trigger member upon extension of the second associated tube section out of the third associated tube section, the nest lock bar configured to restrict movement of the lock member from the locked position when in the engaged position.

In accordance with yet another aspect, a latch for use with a telescoping mast having a plurality of tube sections comprises a latch housing mountable to a tube section, the latch housing having an opening configured to receive a trigger member, a lock member supported by the latch housing for pivoting movement between an unlocked position and a locked position, and a nest lock bar supported by the housing for pivoting movement between an engaged position and a disengaged position. The lock member is movable from the unlocked position to the locked position by a latch member of an associated adjacent tub section as the associated adjacent tube section is extended out of the associated tube section to which the housing is mounted, the lock member movable from the locked position to the unlocked position by return of the associated adjacent tub section. The nest lock bar is biased towards the engaged position and movable to the engaged position by an associated trigger member, the nest lock bar configured to restrict movement of the lock member from the locked position when in the engaged position.

The latch member can further comprise a sliding nest lock member coupled to the lock member for movement therewith, the sliding nest lock member configured to be in an unlocked position when the lock member is in the locked position and a locked position when the lock member is in the unlocked position and the second tube section is fully retracted into the third tube section. The sliding nest lock member can be supported for linear sliding movement within the latch housing, and configured to engage the trigger member when in the locked position. The lock member can be biased towards the unlocked position. The nest lock bar can be biased towards the disengaged position. The latch housing can include a mounting flange for securing the latch housing to the second associated tube section. The latch housing can further include a trigger member for triggering a latch member mounted to an adjacent associated tube section. The trigger member can include an aperture for receiving a sliding nest lock member of a latch member mounted to an adjacent associated tube section.

DETAILED DESCRIPTION

Figure 1:
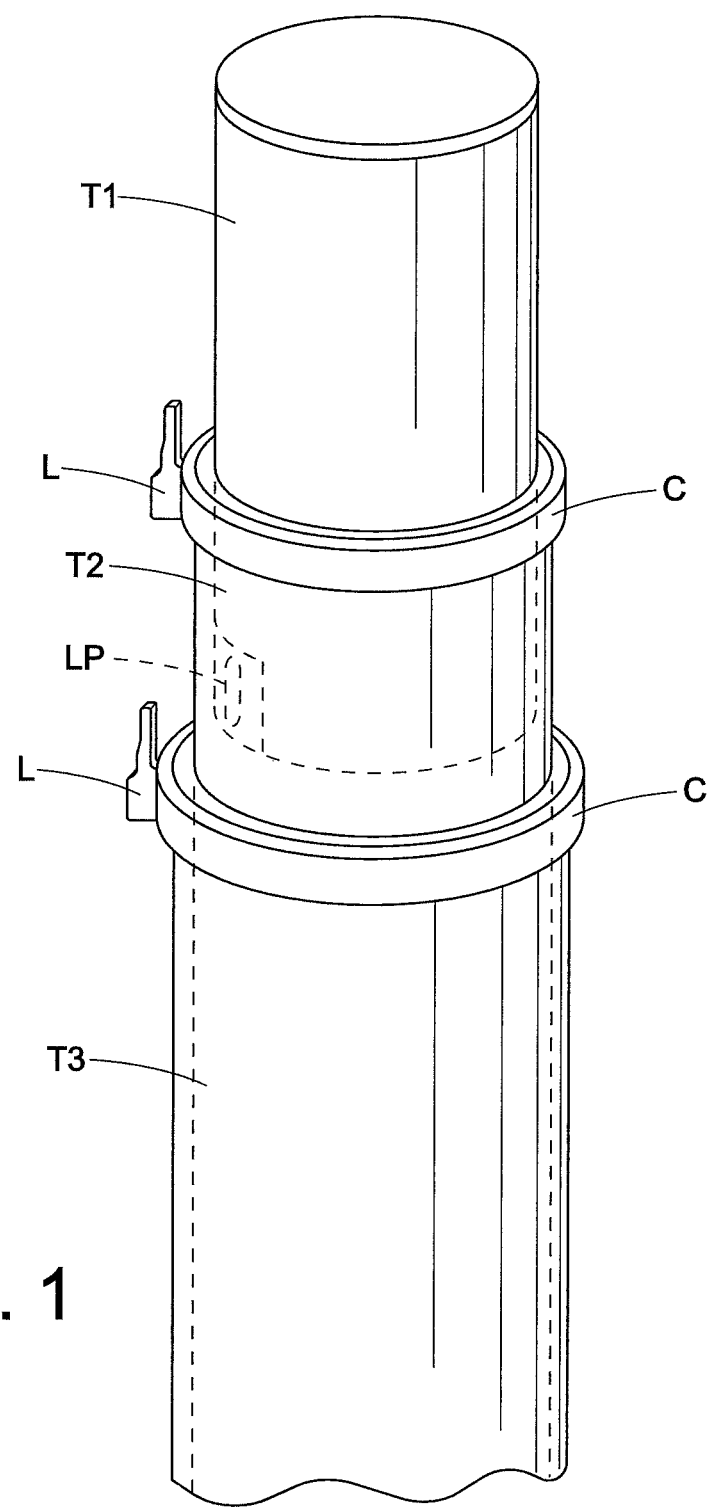
FIG. 1 is schematic view of an exemplary mast including a latch system in accordance with the disclosure.

With initial reference to FIG. 1, a typical drive system for one type of mechanical mast provides lift to the smallest diameter tube T1 first, and then this first tube lifts the next larger (second) tube T2 through physical interference between the tubes once the first diameter tube T1 is fully deployed/extended. During the initial movement of the second tube T2, the first tube T1 is disengaged from the drive mechanism and the second tube T2 is engaged. The first tube T1 is locked to the second tube T2 in the extended position, and the second tube T2 is released from a third tube T3 during this transition period. The second tube T2 is then the driven tube and the process repeats itself with the next set of three tubes for however many tubes comprise the mast, or until a desired mast height is reached. Retraction is generally the reverse of extension.

An exemplary latch system in accordance with the exemplary embodiment includes a latch assembly L mounted to collar C of the second tube T2 and a latch plate LP mounted to the first tube T1. The third tube T3 also includes a latch assembly L mounted to a collar C. It will be appreciated that while the exemplary embodiment includes three tubes T1, T2 and T3, any number of tubes can be used in accordance with aspects of the exemplary embodiment.

Each latch assembly L includes a latch mechanism having a lock member pivotable between an engaged position for interlocking with a corresponding recess in a latch plate LP or a latch feature (e.g., a machined feature in the tube itself configured to accept the lock member) of an adjacent tube to thereby restrict axial movement between the tube sections when the tube sections are in an extended position, and a disengaged position allowing relative axial movement between the adjacent tube sections. A sliding nest lock member engages a trigger post of an adjacent tubes latch body to secure the adjacent tubes in the retracted position.

Figure 2:
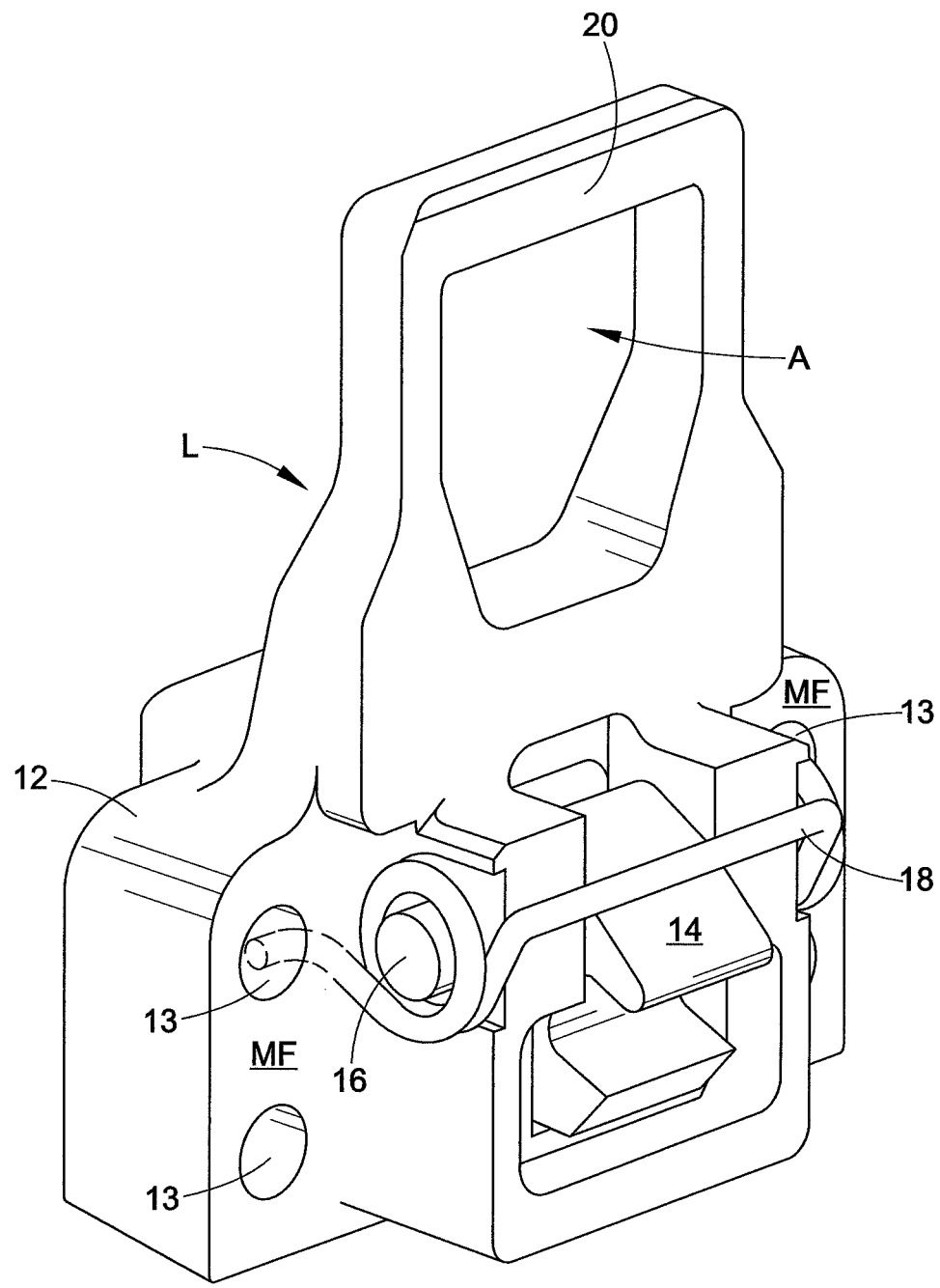
FIG. 2 is a perspective view of an exemplary latch member in accordance with the disclosure.

Turning to FIG. 2, an exemplary latch assembly L includes a latch housing 12 in which a lock member 14 is supported in the housing 12 for pivoting movement by pin 16. The latch housing 12 includes mounting flanges MF for mounting the latch housing 12 to a tube section of a telescoping mast. The mounting flanges MF include a plurality of holes 13 for receiving fasteners, such as bolts, for securing the latch housing 12 to the tube section. An opening O in the housing is configured to receive a trigger member for actuating certain features of the latch assembly, as will be further described below.

The lock member 14 in FIG. 2 is illustrated in an unlocked position. A spring 18 biases the lock member 14 towards the unlocked position. The housing 12 further includes a trigger post 20 extending upwardly from a main portion of the latch housing in which the lock member 14 is supported. As will be described below, during retraction/nesting of adjacent tubes, the trigger post 20 is received in the housing of an adjacent latch assembly L and serves as a nest lock. In addition, during mast extension, the trigger post 20 rotates a nest lock bar of the latch assembly into position as adjacent tubes are extended.

Figure 3:
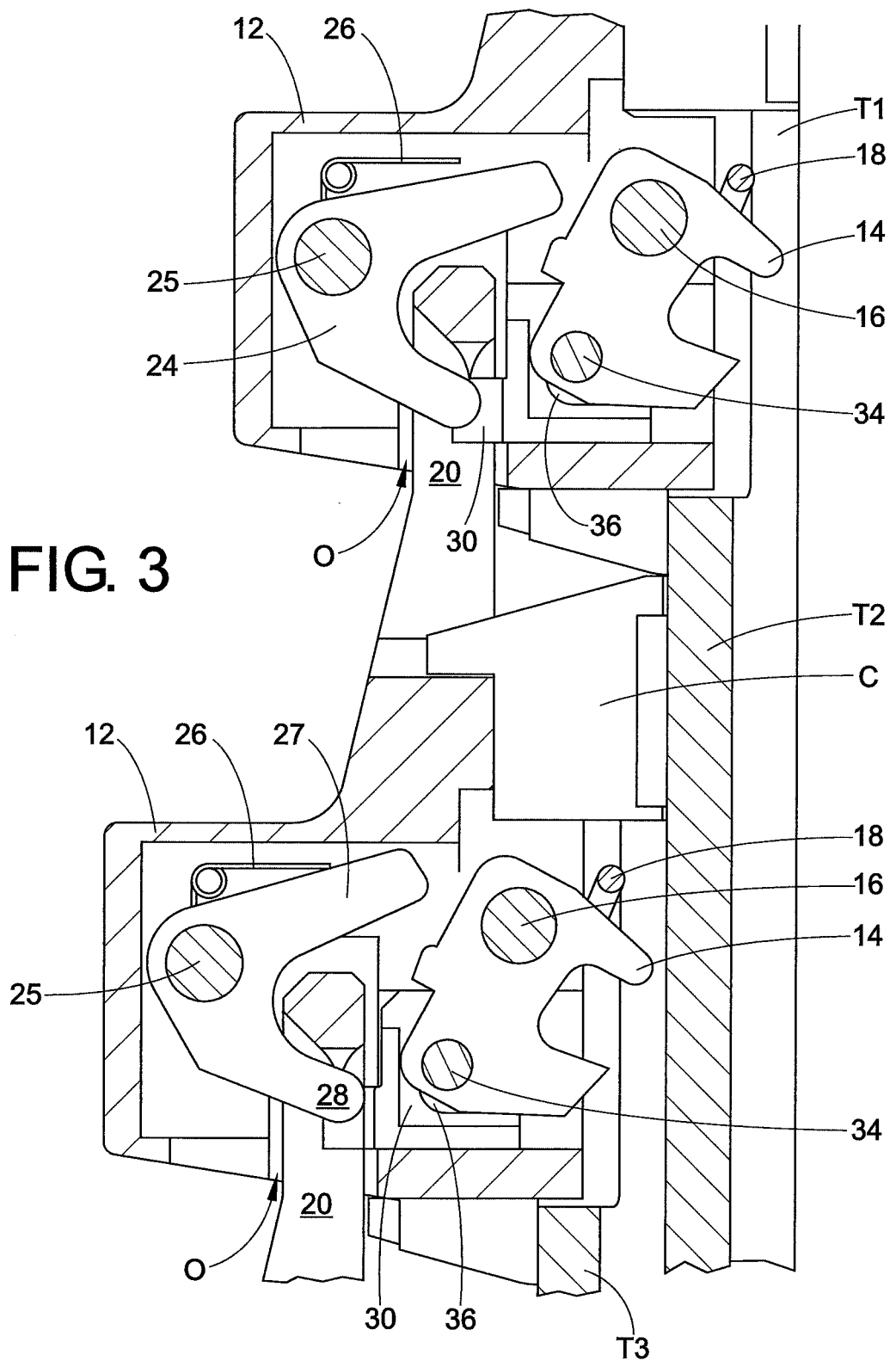
FIG. 3 is a cross-sectional view of a mast including the exemplary latch assembly system of FIG. 1 in a first position.

Additional reference is made to FIG. 3, which is a cross-sectional view of a portion of the exemplary mast assembly of FIG. 1 including portions of the three tubes T1, T2 and T3, and the two latch assemblies L mounted thereto. The three tubes T1, T2 and T3 are illustrated in a nested, or fully retracted, configuration, with the nest lock of each latch assembly L engaged. Each latch assembly L is as described in connection with FIG. 2 and further includes a nest lock bar 24 mounted by a pin 25 for pivoting movement between an unlocked position (shown in FIG. 3) and a locked position. A nest lock bar spring 26 biases the nest lock bar 24 towards the engaged position (disengaged position shown in FIG. 3). The nest lock bar 24 is generally u-shape in cross-section and includes a major arm 27 and a minor arm 28 extending from a base portion. The major arm 27 is configured to engage the lock member 14, while a base portion of the nest lock bar abuts the housing 12. The position at which the nest lock bar 24 engages the lock member is aligned with, or slightly below, the pin 25 such that a force applied to the nest lock bar 24 tends to rotate the nest lock bar in a direction to maintain the base portion in abutting engagement with the housing 12. In this manner, the nest lock bar 24 locks the lock member in the locked position.

A sliding nest lock member 30 is also supported in the housing 12 and is coupled to the lock member 14 by a pin 34 received in a slot 36 of the sliding nest lock member 30. The sliding nest lock member 30 moves back and forth within the housing 12 as the lock member 14 moves between its locked and unlocked positions. As such, the sliding nest lock member 30 is displaced to the left in FIG. 3 when the lock member 14 is in the unlocked position and displaced to the right in FIG. 3 when the lock member 14 is in the locked position. It will be appreciated that, when the sliding nest lock member 30 is displaced to the left in FIG. 3, it extends at least partially into an aperture A of the trigger post 20 of the latch L associated with the adjacent tube. In this manner, the sliding nest lock 30 locks the adjacent tubes in a nested configured.

As previously mentioned, it is preferred to have the latch assemblies L function without outside power or manual intervention. In the exemplary embodiment, the latch assemblies are triggered when the latch plate LP of, for example, the first tube T1 aligns with the latch assembly L on the second tube T2 and the second tube T2 begins to extend. The latch assembly L on the second tube T2 has been held in the unlocked position by the lock member spring 18. When the latch plate P passes the lock member 14, a surface of the latch plate LP engages the lock member 14 and causes rotation of the lock plate 14 to the locked position thereby interlocking tube T2 to tube T1. As the second tube T2 begins to extend, the trigger post 20 is withdrawn from the latch housing 12 and in doing so, engages the minor arm 28 and rotates the nest lock bar 24 clockwise to the locked position. The lock member 14, in the locked position, is received by the latch plate LP, thereby coupling the second tube T2 to the base of the extended tube T1. As the lock member 14 is rotated to the locked position, the sliding nest lock member 30 is moved to the right in FIG. 3, thereby withdrawing it from the aperture A in the trigger post 20 of the adjacent latch assembly L and allowing further and full extension of the second tube T2. This process then repeats on the next adjacent latch assembly once the latch plate LP of the second tube T2 engages with latch assembly on tube T3.

During mast retraction, the first driven tube is the last tube to be raised (for example, the largest diameter tube raised, such as tube T3). The driven tube is lowered to the point where contact is made between the latch assembly L of the driven tube and the trigger post 20 of the latch assembly L of the tube below (or, for example, a trigger post associated with the base tube rigidly mounted to the vehicle). The trigger post engages the major arm 27 and rotates the nest lock bar 24 counterclockwise which then allows the spring 18 to rotate the lock member 14 to the unlocked position, thereby displacing the sliding nest lock member 30 to the left in FIG. 3, such that it is at least partially received in aperture A of the trigger post.

Figure 4:
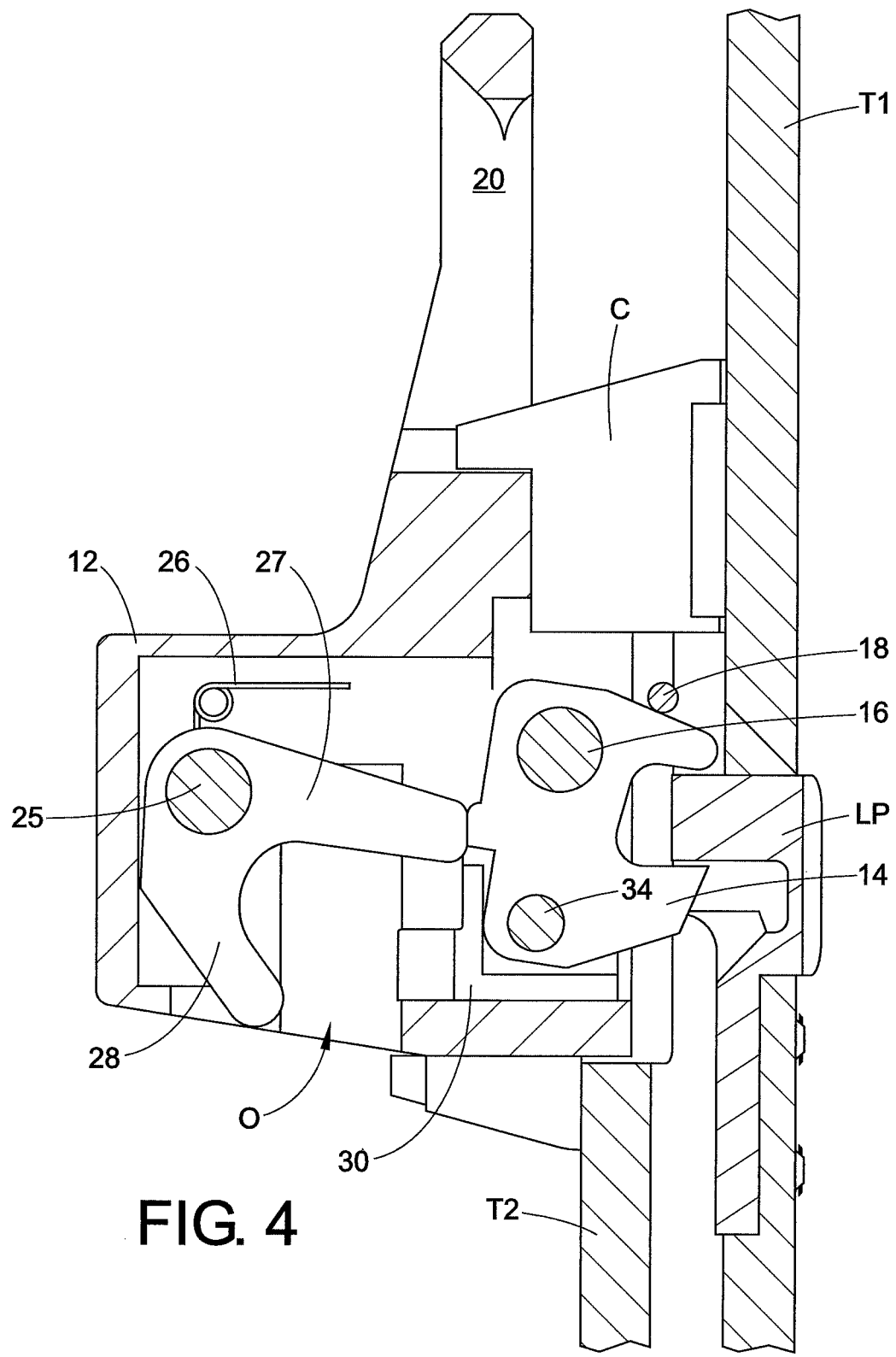
FIG. 4 is a cross-sectional view of the mast and exemplary latch system of FIG. 3 in a second position.

With reference to FIG. 4, an exemplary latch assembly L is illustrated with the lock member 14 in the locked position and the nest lock bar 24 in the engaged position. It will be appreciated that the major arm 27 of the nest lock bar 24 abuts a surface of the lock member 14 at a position below the pivot pin 16, while the base portion of the nest lock bar 24 abuts the latch housing 12. In this manner, the nest lock bar 24 restricts rotation of the lock member 14 out of the locked position. That is, the downward force applied to the lock member 14 via the latch plate LP tends to create a clockwise moment about the pivot pin 16, which is resisted by the nest lock bar 24. Thus clockwise rotation of the lock member 14 is prevented until such time as a trigger post engages and rotates the nest lock bar 24 counterclockwise to the disengaged positon, as previously described.

It should be appreciated that the exemplary embodiment includes a latch assembly having a pivot pin 16 located above the load bearing surface of the lock member 14. As such, the lock member 14 swings open in a common direction to the movement of its associated latch plate. For example, as a tube is being retracted, the downward movement of the latch plate rotates the lock member to the open position where it is then maintained by the lock member spring 18. This allows for smooth and quiet operation as compared to prior art latch assemblies, which open in an opposite direction to tube movement, and eliminates the binding of the lock member and latch plate that is common is those designs. The exemplary embodiment also reduces or eliminates wear on the latch plate resulting from the interferences of parts binding that commonly occurs in those designs.

The sliding nest lock member 30 of the exemplary embodiment simplifies the nest lock function coupling the sliding nest lock member only to the lock member such that the sliding nest lock member is either in a locked or unlocked position based on the position of the lock member. In addition, forces associated with the nest lock are transferred directly to the latch housing 12 via the sliding nest lock member 30.

It will be appreciated that, as used in the foregoing description, the latch assembly L comprises a first or second latch member, while the latch plate LP comprises the other of the first or second latch member. The first and second latch members L and LP are mounted to respective adjacent telescoping tube sections and are configured to work in conjunction as heretofore described. The trigger post that is used to actuate the nest lock bar during initial lifting of a tube section and/or nesting of a tube section comprises a trigger member. Such trigger member can be integral with a latch housing as shown in the figures, or it can be a separate element mounted to an adjacent tube.

Another advantage of the exemplary embodiment is the incorporation of the trigger post into the latch housing. As compared to prior art approaches having separate trigger post members, the exemplary embodiment reduces the number of components by eliminating the separate trigger post and fasteners. In addition, the latch assemblies can be aligned radially on each tube (as opposed to the staggered configuration of the prior art). However, the latch assemblies of the exemplary embodiment can still be staggered if desired.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A latch assembly for a telescoping mast having
a plurality of telescoping tube sections, the latch assembly comprising:
a first latch member mounted to an associated first tube section;
a second latch member mounted to an associated second tube section and configured to selectively engage the first latch member to interlock the first and second associated tubes when the associated first tube section is at least partially extended from the associated second tube section; and
a trigger member mounted to an associated third tube section;
wherein the second latch member includes:
a latch housing having an opening configured to receive the trigger post when the second associated tube section is retracted into the third associated tube section;
a lock member supported by the latch housing for pivoting movement between an unlocked position and a locked position engaging the first latch member to interlock the associated first and second tube sections; and
a nest lock bar supported by the latch housing for pivoting movement between an engaged position restricting movement of the lock member from the locked position and a disengaged position;
wherein the lock member is movable from the unlocked position to the locked position by the first latch member when the first associated tube section is extended out of the second associated tube section to thereby interlock the first associated tube section with the second associated tube section, the lock member movable from the locked position to the unlocked position by the first latch member when the first associated tube section is retracted into the second associated tube section;
wherein the nest lock bar is biased towards the engaged position and movable to the engaged position by the trigger post upon extension of the second associated tube section out of the third associated tube section, the nest lock bar configured to restrict movement of the lock member from the locked position when in the engaged position; and
wherein upon retraction of the associated second tube section into the associated third tube section, the nest lock bar is movable to the disengaged position by the trigger post thereby permitting the lock member to move to the unlocked position as the associated first tube is retracted into the associated second tube section.

2. The latch assembly as set forth in claim 1, further comprising a sliding nest lock member coupled to the lock member for movement therewith, the sliding nest lock member configured to be in an unlocked position when the lock member is in the locked position and a locked position when the lock member is in the unlocked position and the second tube section is fully retracted into the third tube section.

3. The latch assembly as set forth in claim 2, wherein the sliding nest lock member is supported for linear sliding movement within the latch housing and configured to engage the trigger member when in the locked position.

4. The latch assembly as set forth in claim 1, the lock member is biased towards the unlocked position.

5. The latch assembly as set forth in claim 1, wherein the nest lock bar is biased towards the disengaged position.

6. The latch assembly as set forth in claim 1, wherein the latch housing includes a mounting flange for securing the latch housing to the second associated tube section.

7. The latch assembly as set forth in claim 1, wherein the latch housing further includes a second trigger member.

8. The latch assembly as set forth in claim 7, wherein the trigger member includes an aperture for receiving a sliding nest lock member of a latch member mounted to an adjacent associated tube section.

9. A telescoping mast comprising:
a plurality of telescoping tube sections;
a first latch member mounted to a first tube section; and
a second latch member mounted to a second tube section, said first tube section adapted to be telescopically received within the second tube section; and
a trigger member mounted to a third tube section, the first and second tube sections adapted to be telescopically received within the third tube section;
wherein the second latch member includes:
a latch housing having an opening configured to receive the trigger member when the second associated tube section is retracted into the third associated tube section;
a lock member supported by the latch housing for pivoting movement between an unlocked position and a locked position engaging the first latch member to interlock the first and second tube sections in an extended configuration; and
a nest lock bar supported by the latch housing for pivoting movement between an engaged position restricting movement of the lock member from the locked position and a disengaged position;
wherein the lock member is movable from the unlocked position to the locked position by the first latch member as the first tube section is extended out of the second tube section to thereby interlock the first tube section with the second tube section in an extended configuration, the lock member movable from the locked position to the unlocked position by the first latch member as the first tube section is retracted into the second associated tube section; and
wherein the nest lock bar is biased towards the engaged position and movable to the engaged position by the trigger member upon extension of the second tube section out of the third tube section, the nest lock bar configured to restrict movement of the lock member from the locked position when in the engaged position; and
wherein upon retraction of the second tube section into the third tube section, the nest lock bar is movable to the disengaged position by the trigger post thereby permitting the lock member to move to the unlocked position as the first tube is retracted into the second tube section.

10. The telescoping mast as set forth in claim 9, further comprising a sliding nest lock member coupled to the lock member for movement therewith, the sliding nest lock member configured to be in an unlocked position when the lock member is in the locked position and a locked position when the lock member is in the unlocked position and the second tube section is fully retracted into the third tube section.

11. The telescoping mast as set forth in claim 10, wherein the sliding nest lock member is supported for linear sliding movement within the latch housing, and configured to engage the trigger member when in the locked position.

12. The telescoping mast as set forth in claim 9, wherein the lock member is biased towards the unlocked position.

13. The telescoping mast as set forth in claim 9, wherein the nest lock bar is biased towards the disengaged position.

14. The telescoping mast as set forth in claim 9, wherein the latch housing includes a mounting flange for securing the latch housing to the second tube section.

15. The telescoping mast as set forth in claim 9, wherein the latch housing further includes a second trigger member.

16. The telescoping mast as set forth in claim 15, wherein the trigger member includes an aperture for receiving a sliding nest lock member of a latch member mounted to an adjacent associated tube section.

17. A latch for use with a telescoping mast having a plurality of tube sections, the latch comprising;
  latch housing mountable to a tube section, the latch housing having an opening configured to receive a trigger member;
  a lock member supported by the latch housing for pivoting movement between an unlocked position and a locked position; and
  a nest lock bar supported by the latch housing for pivoting movement between an engaged position and a disengaged position;
  wherein the lock member is movable from the unlocked position to the locked position by a latch member of an associated adjacent tube section as the associated adjacent tube section is extended out of the associated tube section to which the housing is mounted, the lock member movable from the locked position to the unlocked position by retraction of the associated adjacent tube section; and
  wherein the nest lock bar is biased towards the engaged position and movable to the engaged position by an associated trigger member mounted to an associated adjacent tube, the nest lock bar configured to restrict movement of the lock member from the locked position when in the engaged position.

18. The latch as set forth in claim 17, wherein the lock member is biased towards the unlocked position.

19. The latch as set forth in claim 17, wherein the nest lock bar is biased towards the disengaged position.

20. The latch as set forth in claim 17, wherein the latch housing further includes a second trigger member.

\* \* \* \* \*